Oct. 13, 1953 — H. C. THORNE — 2,655,264
WASTE-PACKED OIL FILTER
Filed Dec. 21, 1950

INVENTOR.
HERBERT C. THORNE
BY McMorrow, Berman + Davidson
ATTORNEYS

Patented Oct. 13, 1953

2,655,264

UNITED STATES PATENT OFFICE 2,655,264

WASTE-PACKED OIL FILTER

Herbert C. Thorne, Vinton, La.

Application December 21, 1950, Serial No. 202,062

2 Claims. (Cl. 210—131)

1

This invention relates to filtering devices, and more particularly to a waste-packed oil filter for continuous purification of lubricants circulating through a lubricating system.

An object of this invention is to provide a waste-packed oil filter which is particularly adapted for use in the lubricating systems of internal combustion engines.

Another object of this invention is to provide an oil filter which contains a removable waste-packed cartridge, thereby permitting access thereto for removal or replacement of the filtering material.

A further object of this invention is to provide a waste-packed oil filter which effectively filters foreign matter from crude and diesel fuels.

A still further object of this invention is to provide a waste-packed oil filter which is relatively simple in structure and cheap to manufacture.

Figure 1:
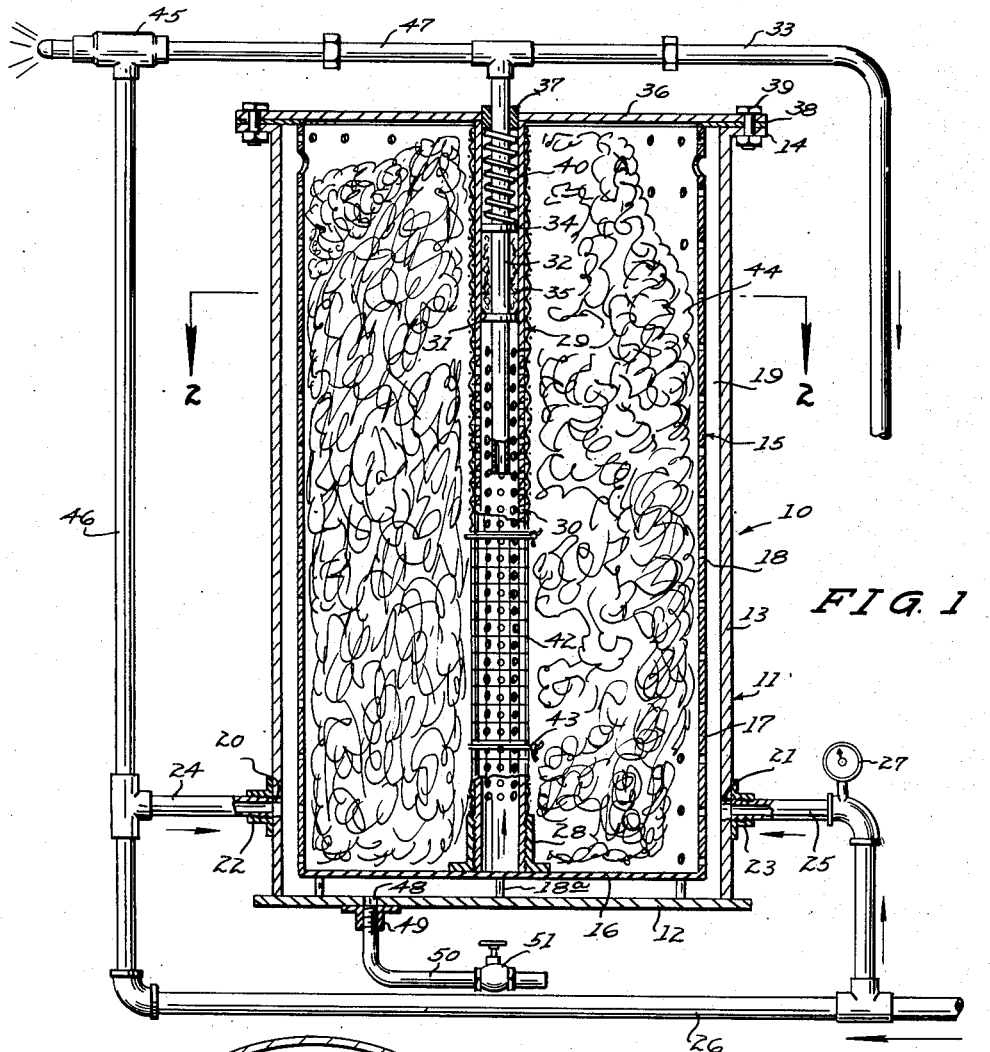
Figure 2:
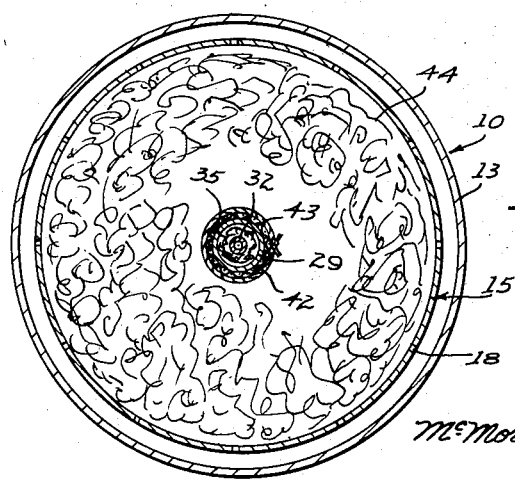

The above and still further objects and advantages of the present invention will become apparent upon consideration of the following detailed description of the invention when taken in conjunction with the accompanying drawings, wherein:

Figure 1 is a longitudinal sectional view of the waste-packed oil filter of the present invention shown connected in the lubricating system of an internal combustion engine; and Figure 2 is a sectional view taken along the line 2—2 of Figure 1.

Referring now with particularity to the drawings, there is shown the oil filter of the present invention, generally designated by the reference numeral 10 connected in the lubricating system of an internal combustion engine.

The oil filter comprises a cylindrical casing 11 including the bottom 12, the casing wall 13 and the outwardly projecting annular flange 14 carried by the cylindrical wall 13 contiguous to the open top of the casing 11.

Disposed within the casing 11 is a cartridge 15 which includes a bottom 16 and a cylindrical wall 17 provided with a plurality of longitudinally and circumferentially spaced apertures 18.

Interposed between the bottom 12 of the casing 11 and the bottom 16 of the cartridge 15 are a plurality of spacers 18a which maintain the bottom 16 of the cartridge in spaced parallel relation about the bottom 12 of the casing 11. The spaced bottoms and spaced cylindrical walls of the cartridge 15 and the casing 11 cooperate to define an annular, oil-receiving chamber 19.

Contiguous to and spaced from the bottom 12,

2 the wall 13 of the casing 11 is provided with opposed inlet ports 20 and 21 for the ingress therethrough of the oil to be filtered. Secured exteriorly of the inlet ports 20 and 21 are the fittings 22 and 23 which receive the pipes 24 and 25 which are connected in communication with the inlet line 26. Connected in the inlet pipe 25 is a pressure gauge 27 for the inlet pressure of the oil to be filtered.

Disposed centrally of the bottom 16 of the cartridge 15 is an upstanding collar 28 which is welded to the bottom 16. Threadedly received and supported within the collar 28 is an upstanding tube 29 which is disposed axially of the cartridge 15. The tube 29 is perforated from a point contiguous to and spaced from the lower end thereof to a point contiguous to and spaced from the upper end thereof, the perforations being generally designated by the reference numeral 30.

Disposed transversely within the tube 29 contiguous to and spaced from the upper end thereof is an abutment 31 which is secured therein. It is to be noted that the abutment 31 is spaced above the uppermost ones of the perforations 30 within the tube 29.

Disposed longitudinally of the tube 29 is an outlet pipe 32 which has one end extending through the abutment 31 and supported therein, and has the other end adapted to be connected to the oil-feeding pipe 33 of the lubrication system for the engine.

Conformably received and supported within the tube 29 intermediate the abutment 31 and the open upper end of the tube is a washer 34 which is mounted on the outlet pipe 32 for movement therealong toward and away from the abutment 31.

Interposed between the washer 34 and the abutment 31 is a mass of packing 35, the abutment 31, the adjacent bounding walls of the tube 29 and the washer 34 cooperating to define a closed chamber for the packing.

Bridging the open top of the casing 11 and the cartridge 15 is a closure 36 which carries a collar 37 centrally thereof for the extension therethrough of the outlet pipe 32. Interposed between the closure 36 and the outwardly projecting annular flange 14 of the casing 11 is an annular gasket 38. Extending transversely through the assembly of the closure 36, the annular gasket 38 and the flange 14 are the bolts 39 for detachably securing the closure 36 in bridging relation with the open tops of the cartridge and the casing.

Interposed between the pipe-receiving collar 37 and the movable washer 34 is a coil spring 40 which is circumposed about the pipe 32 and normally urges the washer 34 toward the abutment 31, to thereby compress the mass of packing 35 and form an oil tight seal.

Circumposed about the perforated tube 29 is a screen 42 which is secured thereabout by tie elements 43. The screen 42 maintains the waste mass 44 received within the cartridge 15 out of the tube 29 which receives the filtered oil.

Arranged exteriorly of the filter is a pressure relief valve 45 which is separately connected to the feed line 26 and the outlet pipe 33 by means of the connecting pipes 46 and 47 for opening the closed system after a predetermined pressure has been reached within the system.

The bottom wall 12 of the casing 11 is provided with a drain port 48. Secured exteriorly of the bottom 12 is a fitting 49 to which is secured the drain pipe 50 which is in communication with the drain port 48. Connected in the drain pipe 50 is a manually actuable control valve 51 for selectively opening and closing the drain pipe 50.

In actual use, the wire screen 42 is wrapped about the perforated tube 29 and secured thereabout by the tie elements 43. The perforated tube 29 is then inserted within the cartridge 15 and threadedly engaged with the upstanding collar 28. A mass of waste is packed into the cartridge 15, care being taken not to pack the waste too tightly within the cartridge. The coil spring 40 is then slipped over the outlet pipe 32 and the washer 34 is slidably supported on the outlet pipe 32. The mass of packing 35 is then wrapped about the outlet pipe 32. The amount of packing utilized is determined by the amount necessary to tension the spring 40 when the outlet pipe 32 is inserted within the tube 29 and the closure 36 is bolted to the casing. Upon bolting the closure 36 to the casing, a complete seal is formed between the casing and the closure and the spring 40 compresses the packing 35 to form a fluid-tight seal between the outlet pipe 32 and the tube 29. The filter is then connected in the lubrication system, as illustrated in Figure 1, and the filter is ready to receive oil. The pressure observed on the pressure valve 27 from day to day will increase as the carbon contained within the oil is deposited in the filtering material 44, thereby increasing the resistance to the flow of the oil therethrough. At any time the drain pipe 50 may be opened by means of the valve 51 to remove any water which may accumulate in the bottom of the filter.

Although only one embodiment of the waste-packed oil filter of the present invention has been described, it is readily apparent that numerous modifications may be made without departing from the spirit of the invention as set forth in the appended claims.

What I claim is:

1. An oil filter comprising a casing including a bottom and an upstanding wall having the lower end secured to said bottom, opposed inlet ports being provided in said upstanding wall intermediate the lower and upper ends thereof, a cartridge comprising a bottom and a perforated upstanding wall disposed upon and having the lower end secured to the last named bottom positioned within said casing, the upper end of the cartridge upstanding wall being flush with the upper end of the casing upstanding wall with the bottom and upstanding wall of said cartridge being spaced from the bottom and upstanding wall of said casing and defining an oil receiving chamber, a closure bridging the upper ends of said casing and cartridge upstanding walls and secured to said upstanding casing wall, an upstanding collar positioned within said cartridge and secured to the cartridge bottom, an upstanding perforated tube positioned within said cartridge and having the lower end threadedly engaged with said collar, a screen surrounding and secured to said tube and forming with the perforated upstanding cartridge wall a space for the reception of a mass of waste filtering material therein, and an outlet means exteriorly of said casing and in communication with said tube adjacent the upper end of the latter.

2. An oil filter comprising a casing including a bottom and an upstanding wall having the lower end secured to said bottom, opposed inlet ports being provided in said upstanding wall intermediate the lower and upper ends thereof, a cartridge comprising a bottom and a perforated upstanding wall having the lower ends secured to the last named bottom positioned within said casing, the upper end of the cartridge upstanding wall being flush with the upper end of the casing upstanding wall with the bottom and upstanding wall of said cartridge being spaced from the bottom and upstanding wall of said casing and defining an oil receiving chamber, a closure bridging the upper ends of said casing and cartridge upstanding walls and secured to the upstanding casing wall, an upstanding collar positioned within said cartridge and secured to the cartridge bottom, an upstanding perforated tube positioned within said cartridge and having the lower end threadedly engaged with said collar and having the upper end supported in said closure, a screen surrounding and secured to said tube and forming with the perforated upstanding cartridge a space for the reception of a mass of waste filtering material therein, a fixed abutment in said tube adjacent the upper end thereof, and an outlet pipe extending through the upper end of said tube and said abutment and having the lower end in communication with said tube below said abutment and having the upper end exteriorly of said casing.

HERBERT C. THORNE.

References Cited in the file of this patent

UNITED STATES PATENTS

| Number | Name | Date |
|---|---|---|
| 733,174 | Engel | July 7, 1903 |
| 2,071,550 | Matheson | Feb. 23, 1937 |
| 2,272,583 | Reed | Feb. 10, 1942 |
| 2,337,238 | Griffith | Dec. 21, 1943 |
| 2,359,386 | Reinsch | Oct. 3, 1944 |
| 2,381,627 | Thompson | Aug. 7, 1945 |
| 2,393,886 | Clay | Jan. 29, 1946 |
| 2,487,146 | Lasky | Nov. 8, 1949 |
| 2,559,267 | Winslow et al. | July 3, 1951 |